United States Patent
Watts, Jr. et al.

(10) Patent No.: US 6,295,197 B1
(45) Date of Patent: Sep. 25, 2001

(54) WIRELESS COMMUNICATION APPARATUS

(75) Inventors: La Vaughn F. Watts, Jr.; Erica Scholder, both of Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/491,485

(22) Filed: Jan. 25, 2000

(51) Int. Cl.[7] .................................................. G06F 1/16
(52) U.S. Cl. ..................... 361/683; 361/727; 312/223.2; 343/702
(58) Field of Search .................................. 361/683, 680, 361/681, 724–727; 312/223.2–223.3; 400/713, 714; 206/320, 576; 343/702; 455/450

(56) References Cited

U.S. PATENT DOCUMENTS

| | | | |
|---|---|---|---|
| 4,978,317 | 12/1990 | Pocrass | 439/490 |
| 5,043,736 | 8/1991 | Darnell et al. | 342/357 |
| 5,183,404 | * 2/1993 | Aldous et al. | 455/450 |
| 5,244,409 | 9/1993 | Guss, III et al. | 439/490 |
| 5,300,938 | 4/1994 | Maroun et al. | 343/702 |
| 5,373,149 | 12/1994 | Rasmussen | 235/492 |
| 5,557,288 | 9/1996 | Kato et al. | 343/702 |
| 5,613,873 | 3/1997 | Bell, Jr. | 439/490 |
| 5,619,395 | 4/1997 | McBride | 361/683 |
| 5,644,320 | 7/1997 | Rossi | 343/702 |
| 5,677,698 | 10/1997 | Snowdon | 343/770 |
| 5,739,791 | 4/1998 | Barefield et al. | 343/702 |
| 5,793,627 | * 8/1998 | Caldes et al. | 363/146 |
| 5,801,922 | * 9/1998 | Shen et al. | 361/686 |
| 5,828,341 | 10/1998 | Delamater | 343/702 |
| 5,861,851 | * 1/1999 | Chang | 343/702 |
| 5,864,708 | 1/1999 | Croft et al. | 395/821 |
| 5,943,018 | 8/1999 | Miller | 343/702 |
| 6,014,036 | * 1/2000 | Bozlo et al. | 326/21 |
| 6,119,138 | * 9/2000 | Pinckney et al. | 361/686 |
| 6,152,762 | * 11/2000 | Marshall et al. | 439/489 |

* cited by examiner

Primary Examiner—Leo P. Picard
Assistant Examiner—Hung Van Duong
(74) Attorney, Agent, or Firm—Haynes and Boone, L.L.P.

(57) ABSTRACT

A control module includes a control module having a body and a jack portion extending from the body for being received in a mating receptacle. The jack portion carries a plurality of contacts. A wireless communication portion is attached to the body. A switch portion is attached to the body. The switch portion is electrically connected to at least a portion of the contacts. A single receptacle assembly can be used to separately interconnect a plurality of types of communication devices to an electronic device in a space efficient and cost-effective manner.

21 Claims, 6 Drawing Sheets

WIRELESS COMMUNICATION APPARATUS

BACKGROUND

The disclosures herein relate generally to communication systems and more particularly to wireless communication apparatus in a computer.

A variety of communication devices may be used in a computer. A conventional modem may be used to communicate data over a conventional telephone line. A network interface controller (NIC) card is used to provide data transmission over a computer network. Various types of radio frequency communication devices may be used in a computer for communication with a variety of types of networks such as a personal area network or a local area network.

Wireless communication is becoming a desired capability for portable and desktop computers. However, various aspects of a computer, particularly a portable computer, complicate the task of providing a wireless communication system in a computer. The addition of wireless communication capability in portable computers presents a variety of physical and functional design challenges. Some of these complications are also applicable to desktop computers.

The physical size of portable computers limits the space available for various components of a wireless communication interface. Expansion slots may be used for various communication devices. However, the number of available expansion card slots is limited. For example, in many portable computers, two PCMCIA expansion card slots are provided and one or both of the slots can be used to provide wireless communication capability. However, if PCMCIA cards are being used for providing two types of wireless communication capability (i.e. a wireless local area network PCMCIA card and a wireless personal area network PCMCIA card), both PCMCIA slots are occupied, precluding the use of other expansion card enabled functionality.

A wireless communication device for a computer typically includes a radio portion, a user interface portion, and an antenna portion. Depending on the particular configuration of the portable computer, the various portions of the wireless communication device may be mounted internally, externally or both internally and externally relative to the enclosure of the computer. Further, the various portions and components of the wireless communication device may be integral or discrete with respect to each other.

U.S. Pat. No. 5,828,341 discloses a portable computing device having a computer programmed to store and communicate information and a housing configured to house the computer. A communications device, provided in the housing, is controlled by the computer and configured to communicate information between the computing device and a remote computer. An antenna is carried by the housing and is configurable to electrically couple with the communications device for communicating radio frequency information with the remote computer. A signal coupling device is carried by the housing and is configured to removably mate in signal transmitting relationship with an external antenna via a complementary mating signal coupling device. A switch provided with the device is constructed and arranged to selectively connect the communications device with a dedicated antenna and an external antenna.

U.S. Pat. No. 5,606,594 discloses a telephone accessory and method of telecommunicating for a personal digital accessory ("PDA"). The PDA includes a chassis of particular dimensions and input/output ("I/O") circuitry on a front surface of the chassis. The chassis contains processing circuitry coupled to the I/O circuitry. The telephone accessory includes a body portion having a concave surface adapted to receive the chassis. A first body extension and a second body extension are coupled to opposite ends of the body portion. Communications circuitry capable of being coupled to the processing circuitry in the chassis when the chassis is received into the concave surface on the body portion is provided. The communications circuitry includes a communications transceiver capable of coupling the processing circuitry to remote processing circuitry via a communications link.

U.S. Pat. No. 5,373,149 discloses a PCMCIA wireless credit card modem fabricated using two credit card sized sections interconnected by a hinge. The first section contains modem circuitry and the second section contains an antenna and radio circuitry. The two sections form a 90 degree angle in the open position. The section with the modem circuitry fits into a type I or II PCMCIA slot in a portable computer. The section with the antenna remains on an outside portion of the computer. The folding electronic card assembly can interface to several different PCMCIA card slots.

A key challenge in providing wireless communication capability in a computer, particularly in a portable computer, is the physical mounting or interconnecting of the various components of the communication device. Portable computers produced by the same manufacturer, as well as by different manufacturers, are not identical. In addition, it is preferred for computers to be designed for permitting wireless capability to be enabled subsequent to the manufacture of the computer, such as by the user following purchase of the computer. Consequently, conventional techniques for providing wireless communication capability require numerous configurations of wireless communication devices, or at least components thereof, to accommodate the various types of portable computers and situations under which wireless communication capability is provided.

Another key challenge in providing wireless communication capability in a computer, particularly in a portable computer, is enabling a modular and dynamic design solution such that wireless communication devices of various configurations (i.e. designed according to different radio specifications) can be cost-effectively and conveniently implemented in a manufacturing setting as well as by the user subsequent to the manufacture of the computer.

A number of different industry standards for radio specifications exist. These radio specifications include, for example, the specification of Bluetooth Special Interest Group, referred to by the tradname Bluetooth, or the specification of the Institute of Electrical and Electronics Engineers Incorporated, referred to as 802.11. In addition to the industry standards for radio specifications, a number of design criteria mandated by various regulatory agencies, such as the Federal Aviation Administration, also exist. Conventional techniques for providing wireless communication capability are limited in the number of different industry standards that are compatible. Furthermore, these conventional techniques do not provide a suitable solution for complying with certain regulatory agency and industry standard mandated design criteria.

Therefore, what is needed is a wireless communication apparatus that provides a generally universal packaging solution across a wide range of physical computer designs, that permits interconnect compatibility with a plurality of different input signals and that is operable in a dynamic manner to identify and operate according to specific requirements of various components and specifications of the wireless communication system.

SUMMARY

One embodiment, accordingly, provides a control module for controlling the operability and signal communication of a wireless communication device in an electronic apparatus. To this end, a control module includes a body and a jack portion extending from the body for being received in a mating receptacle. The jack portion carries a plurality of contacts. A wireless communication portion is attached to the body. A switch portion is attached to the body. The switch portion is electrically connected to at least a portion of the contacts.

A principal advantage of this embodiment is that a single receptacle assembly can be used to separately interconnect a plurality of types of communication devices to an electronic device in a space efficient and cost-effective manner.

DETAILED DESCRIPTION

Figure 1:
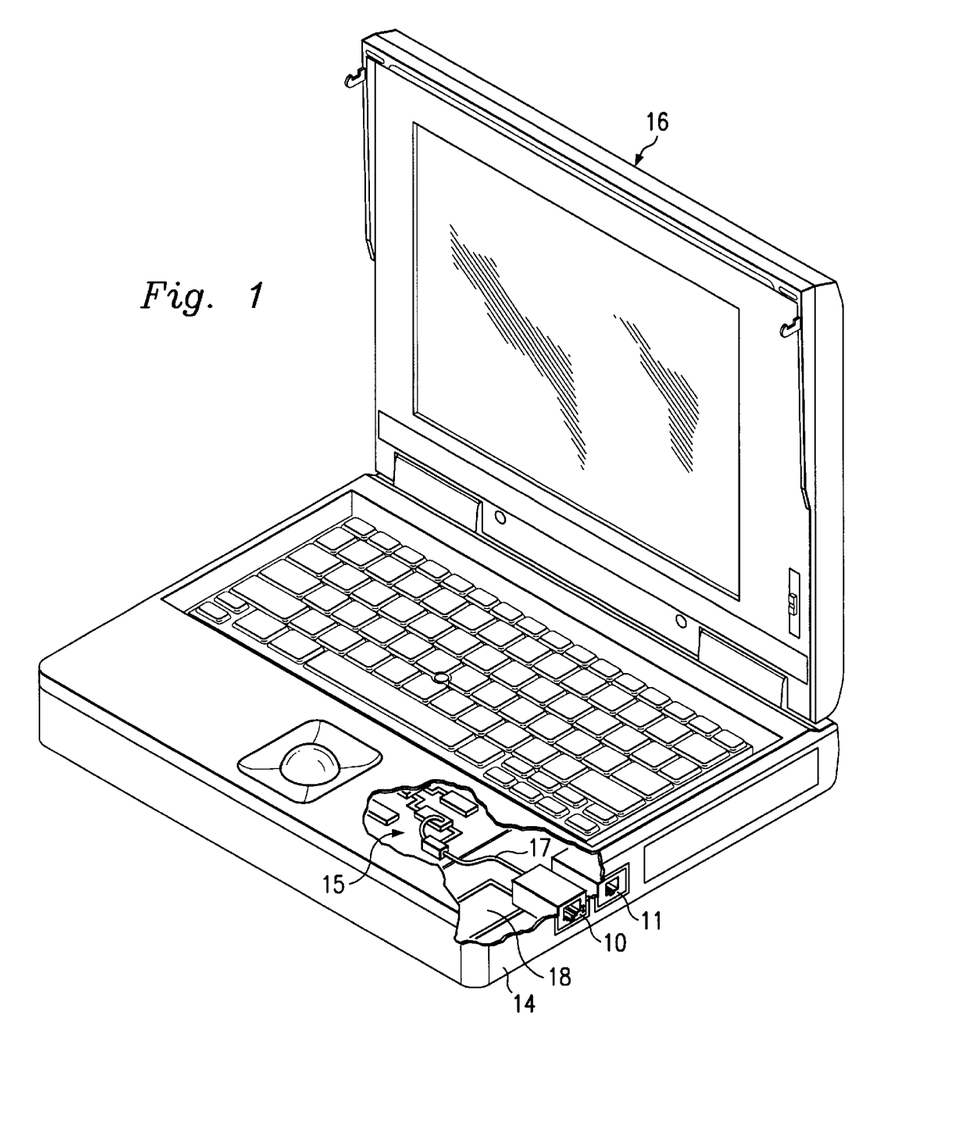
FIG. 1 is a perspective view illustrating an embodiment of a portable computer.
Figure 2:
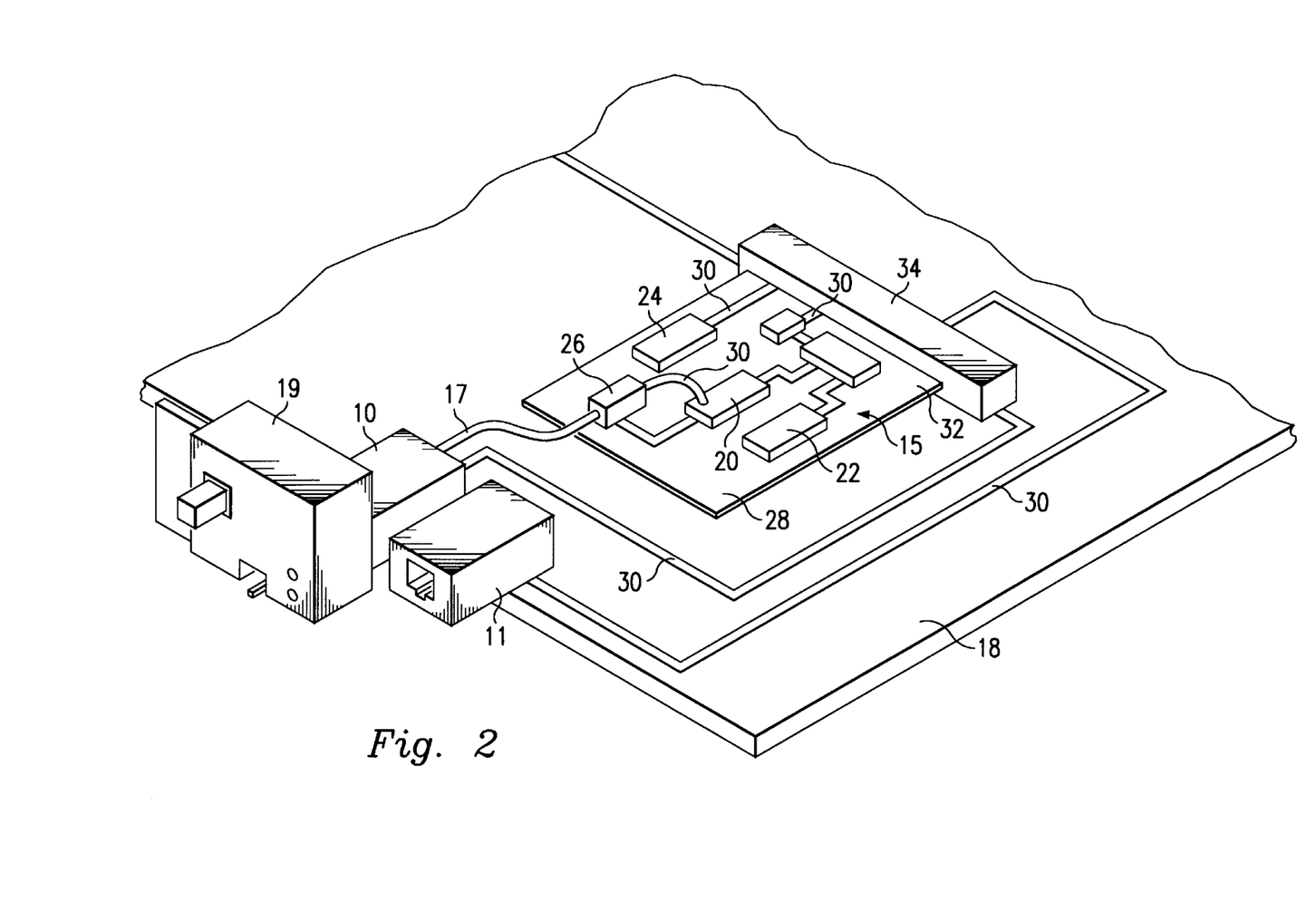
FIG. 2 is a perspective view illustrating an embodiment of a communication apparatus.

Referring to FIGS. 1 and 2, a first receptacle assembly 10, second receptacle assembly 11, and communication module 15 are mounted in an enclosure 14, FIG. 1, of a portable computer 16. A controlled impedance interface 17 such as a coaxial cable is electrically connected between the first receptacle assembly 10 and the communication module 15. The communication module 15, the first receptacle assembly 10 and the second receptacle assembly 11 are mounted on a printed circuit substrate 18 such as a motherboard of the portable computer 16. A control module 19 is releasably attached to the first receptacle assembly 10.

The portable computer 16 illustrated in FIG. 1 is an example of an electronic device in which receptacle assemblies such as the first and second receptacle assemblies 10, 11 may be mounted. Other types of electronic devices in which receptacle assemblies such as the first and second receptacle assemblies 10, 11 may be mounted include other types of computers, (i.e. desktop computers), personal digital assistants, and the like.

An electronic device such as the portable computer 16 may include a plurality of receptacle assemblies such as the first and second receptacle assemblies 10, 11. Typically, if two or more receptacle assemblies are provided, the first receptacle assembly 10 is of a different type than the second receptacle assembly 11. For example, it is common in computers to have one receptacle assembly configured for receiving an RJ11 type jack and another receptacle assembly configured for receiving an RJ45 type jack. The RJ11 type jack is typically used for connecting a telephone line to the computer and the RJ45 type jack is typically used for connecting the computer to a local area network data line. Conventional jack assemblies having receptacles for receiving an RJ11-type jack or an RJ45 type jack are commercially available from manufacturers such as Foxconn Incorporated and Amp Incorporated.

Referring now to FIG. 2, the communication module 15 includes a wireless communication device 20 such as a radio frequency (RF) communication module, a network interface device 22 such as a network interface controller (NIC) card, a modem device 24 and a connector 26 mounted on a printed circuit substrate 28. A lead 30 is electrically connected between the connector 26 and the wireless communication device 20. The printed circuit substrates 18, 28 are preferably printed circuit boards including a plurality of conductive traces 30 for routing signals and power to the various components mounted thereon. Each one of the traces 30 may represent more than one trace extending between two system components. In some cases, for clarity, only one of the traces 30 is shown to extend between two or more system components. The printed circuit substrate 28 includes an edge connector portion 32 for being connected to a connector 34, such as a PCI bus connector, of the printed circuit substrate 18.

An example of a wireless communication device 20 includes an RF wireless communication module offered by Aironet Incorporated under the model no. PC4800A (part no.100-005048-001). An example of a network interface device 22 is an NIC card offered by 3Com Incorporated under the part no. 3C905C-TX-M. An example of a modem device 24 includes a soft modem semiconductor device offered by PCTel under the part number PCT2303W.

Figures 3A, 3B, 4:
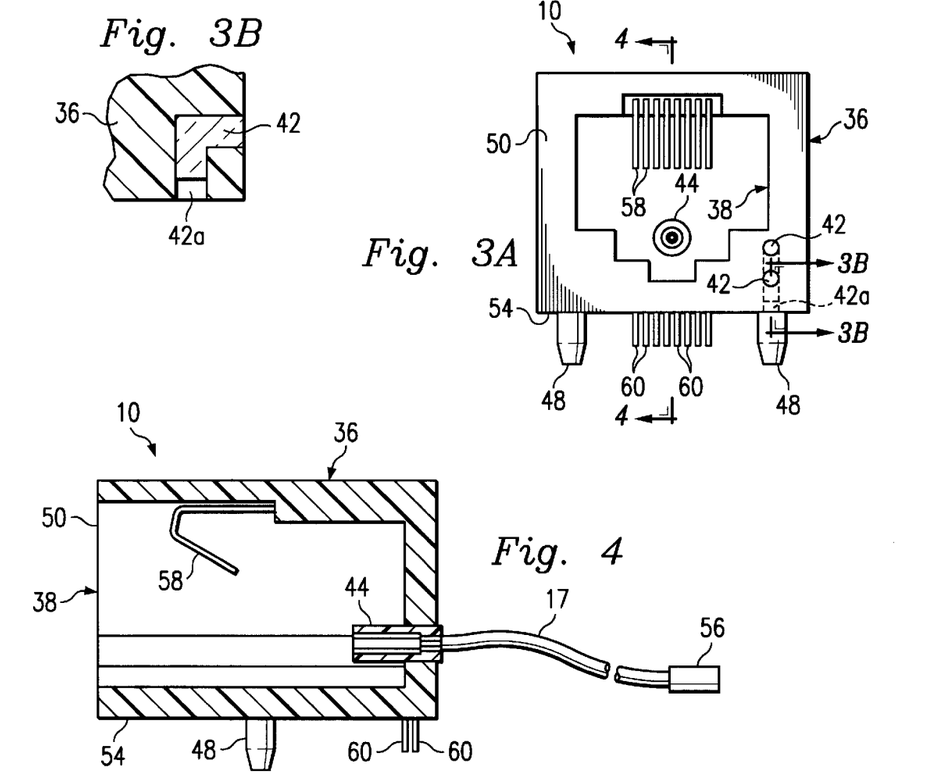
FIG. 3A is a front view illustrating an embodiment of a receptacle assembly.
FIG. 3B is a cross sectional view taken along the line 3B—3B in FIG. 3A.
FIG. 4 is a side view of the receptacle assembly illustrated in FIG. 3A.

An embodiment of the receptacle assembly 10 is illustrated in FIGS. 3A and 4. The receptacle assembly 10 includes a body 36 having a receptacle 38, a plurality of illumination devices 42 and a connector 44 for attaching an antenna thereto. The connector 44 is attached to the body within the receptacle 38. A plurality of mounting pins 48 are attached to the body 36 for physically attaching the receptacle assembly 10 to the housing 14 or to one of the printed circuit substrates 18, 28. The receptacle 38 extends through a front face 50 of the body 36. By integrating the illumination devices 42 and connector 44 into the body 36, the physical volume of the receptacle assembly 10 can be used to add additional functionality to an electronic device, such as the portable computer 16, without requiring any significant additional space.

A jack of an auxiliary electronic apparatus (not shown) or the control module 19, FIG. 2, may be inserted through the front face 50 into the receptacle 38. The illumination devices 42 and connector 44 are mounted to extend generally perpendicular to the front face 50 of the body 36. It is contemplated that the switch 40, illumination devices 42 and connector 44 may be mounted in different orientations. However, it is desirable for the illumination devices 42 to be readily viewable during operation of the computer 16.

The body 36 is preferably fabricated using a known process such as injection molding and is preferably made of a commercially available material such as a suitable type of plastic. The receptacle 38 is preferably integrally molded as a feature of the body 36. In other embodiments, the receptacle 38 may be separately formed from the body 36 and attached to the body 36 using known techniques. The illumination devices 24 and the antenna connector 26 may be insert molded into the body 36 or mounted on the body 36 subsequent to the fabrication of the body 38.

The illumination devices 42, FIGS. 3A, 3B and 4, are light conducting members including a cavity 42a for receiving a powered illumination device such as a light emitting diode (not shown) mounted on the substrate 18, FIG. 2. The illumination devices 42 are provided for visually indicating when the communication module 15 is sending and receiving information. U.S. Pat. No. 5,613,873 discloses a technique for using light conducting members, such as light pipes, that are mounted in a receptacle assembly for conducting light from light emitting diodes that are mounted directly on a substrate, such as the printed circuit substrate 18 illustrated in FIG. 2.

A plurality of contacts 58, FIGS. 3 and 4, are mounted on the body 36. The contacts 58 extend into the receptacle 38 for being engaged by mating contacts of a jack (not shown) inserted into the receptacle 38. The receptacle 38 serves as a data communication portion of the receptacle assembly 10. An interconnect member 60 is electrically connected to each one of the contacts 58. Each interconnect member 60 extends from a face of the body 36, such as a mounting face 54. The interconnect members 60 are configured for being electrically connected to a substrate such as the printed circuit substrate 18, illustrated in FIG. 2, thereby permitting electrical connection with other system components mounted on the printed circuit substrate 18, such as the communication module 15.

The connector 44, preferably a coaxial-type antenna connector, serves as a wireless communication portion of the receptacle assembly 10. The controlled impedance interface 17 is attached at a first end to the connector 44. The controlled impedance interface 17 is attached at a second end to a plug 56. The plug 56 is configured to be attached to a connector such as the connector 26, FIG. 2.

Figure 5:
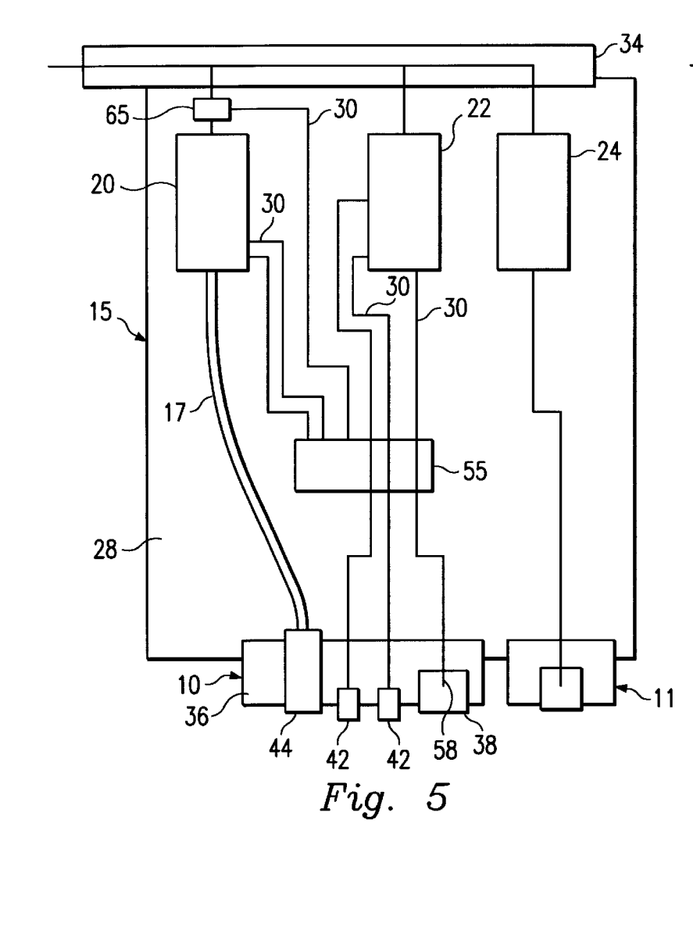
FIG. 5 is a schematic view illustrating an embodiment of a communication apparatus.
Figure 6:
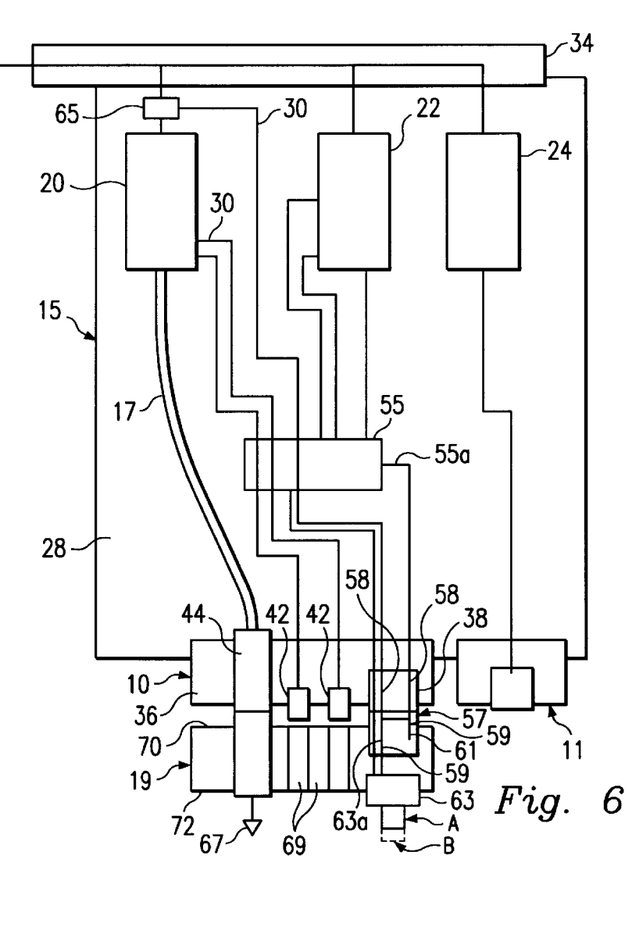
FIG. 6 is a schematic view of the communication apparatus of FIG. 5 with a first communication device being controlled by a control module.

Referring now to FIGS. 5 and 6, the communication module 15 includes a circuit routing device 55, such as a multiplexor, that controls whether the wireless communication device 20 or the network interface device 22 is operably connected to the receptacle assembly 10. The circuit routing member 55 includes a selector input 55a. The routing of signals and power through the circuit routing member 55 are dependent on the level of voltage applied to the selector input 55a. Suitable multiplexors are offered by Texas Instruments under part nos. 74AS850A and 74AS851B.

A jack portion 57 of the control module 19, FIG. 6, is configured to be mounted in the receptacle 38 of the receptacle assembly 10. The jack portion 57 includes a plurality of contacts 59 that mate with corresponding contacts 58 of the receptacle assembly 10.

When the control module 19 is not inserted in the receptacle assembly 10, FIG. 5, the selector input 55a of the circuit control device 55 is maintained at a first voltage, causing the illumination devices 42 and at least a portion of the contacts 58 of the receptacle 38 to be operably connected through the circuit routing device 55 to the network interface device 22. In this state, the receptacle assembly 10 may be used for providing communication with the network interface device 22. By inserting the control module 19 into the receptacle assembly 10, FIG. 6, the voltage applied to the selector input 55a is changed to a second voltage, causing the illumination devices 42 and at least a portion of the contacts 58 of the receptacle 38 to be operably connected through the circuit routing device 55 to the wireless communication device 20. In this state, the receptacle assembly 10 may be used for providing communication with the wireless communication device 20.

In the embodiment of the control module illustrated in FIG. 6, one of the contacts 59 of the jack portion 57 is configured to be a control element 61. The control element 61 is electrically connected to a constant voltage input 63a of a switch portion 63 of the control module 19. The constant voltage input of the switch portion 63 is at a different voltage than the input selector 55a when the control module 19 is not attached to the receptacle assembly 10. By inserting the control module 19 into the receptacle 38, the control element 61 is electrically connected to the input selector 55a. Accordingly, the voltage at the input selector 55a is changed, resulting in the wireless communication device 20 being operable rather than the network interface device 22. Other techniques for controlling the operation of the circuit routing device 55 are contemplated. These include the use of mechanical and/or electrical devices for sensing the presence of the control module 19 in the receptacle assembly 10.

When the control module 19 is mounted on the receptacle assembly 10, the switch portion 63 of the control module 19 is electrically connected through the circuit routing device 55 to a voltage control device 65. When the switch portion 63 is in a first position A, such as an on position, power from the connector 34 is supplied through the voltage control device 65 to the wireless communication device 20, permitting operation of the wireless communication device 20. When the switch portion 63 is moved to a second position B, such as an off position, power is not supplied through the voltage control device to the wireless communication device 20, inhibiting operation of the wireless communication device 20. Transistors and relays are examples of commercially available devices suitable for use as the voltage control device 65.

Figure 7:
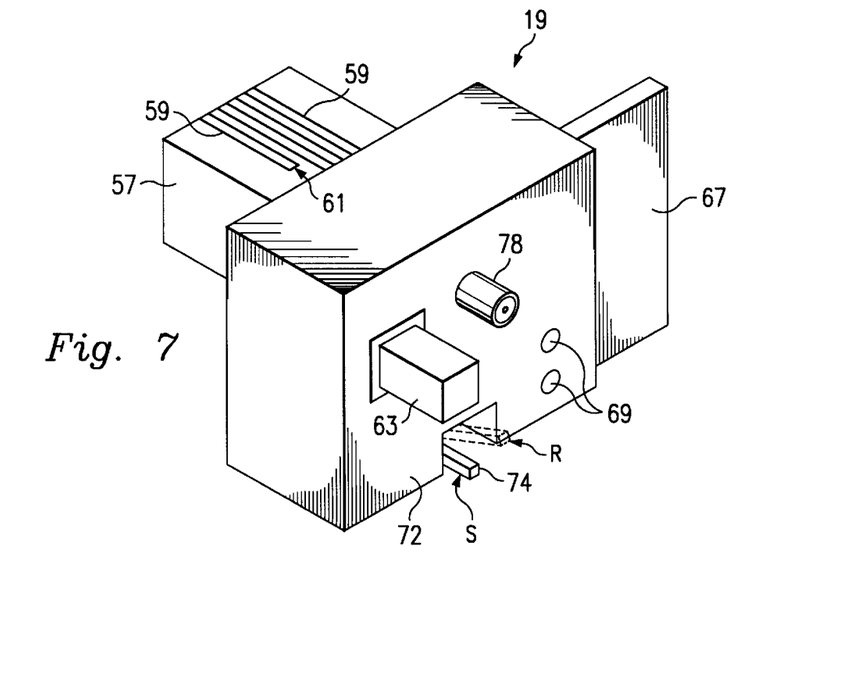
FIG. 7 is a perspective view illustrating an embodiment of a control module.
Figure 8:
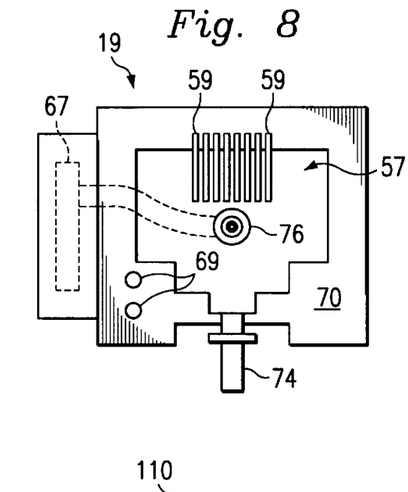
FIG. 8 is a rear view of the control module illustrated in FIG. 7.

Referring now to FIGS. 6–8, the control module 19 includes an antenna 67 that is electrically connected to the connector 44 when the control module 19 is attached to the receptacle assembly 10. The antenna 67 may be substantially internal to the control module or may extend from a surface of the control module. Signals are communicated between the antenna 67 and wireless communication device 20 through the controlled inductance interface 17, FIG. 6.

A plurality of light conducting members 69, such as light pipes, extend between a first surface 70 and a second surface 72 of the control module 19. When the control module 19 is mounted on the receptacle assembly 10, the light conducting members 69 are positioned adjacent to the illumination devices 42, FIG. 6. In this configuration, light emitted by the illumination devices 42 is conducted through the light conducting members 69, permitting the light from the illumination devices 42 to be viewed at the second surface 72 of the control module 19. The light conducting members define an operation indicator portion of the control module 19, permitting the transmission and reception operations of the communication module 15 to be visually verified.

A module release mechanism 74 is attached to the control module 19, FIGS. 7 and 8. The release mechanism 75 is biased to a first position S for securing the control module in fixed relation to the receptacle assembly 10 when the jack portion 57 of the control module 19 is mounted in the receptacle 38 of the receptacle assembly 10. The release mechanism 74 is movable to a second position R for permitting the jack portion 57 of the control module 19 to be released from the receptacle 38 of the receptacle assembly 10.

A connector 76, FIG. 8, is attached to the control module 19. The connector 76 is electrically connected to the antenna 67. The connector 76 is positioned on the jack portion 57 such that it engages the mating connector 44 of the receptacle assembly when the jack portion 57 is mounted in the receptacle 38. A connector 78 extends from the second surface 72 of the control module 19 and is operably connected to the connector 76 for permitting an auxiliary antenna (not shown) to be connected through the control module 19 to the wireless communication device 20.

For applications such as portable computers, for space reasons, it is desirable for the wireless communication device 20 and the network interface device 22 to be provided on a common printed circuit substrate, such as the printed circuit substrate 28 illustrated in FIG. 6. It is also desirable for the circuit routing device 55 and the voltage control device 65 to be mounted on the same printed circuit substrate as the wireless communication device 20 and the network interface device 22.

Figure 9:
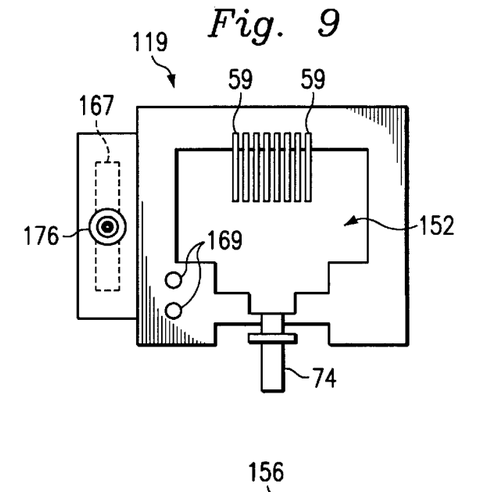
FIG. 9 is a rear view of another embodiment of a control module.
Figure 10:
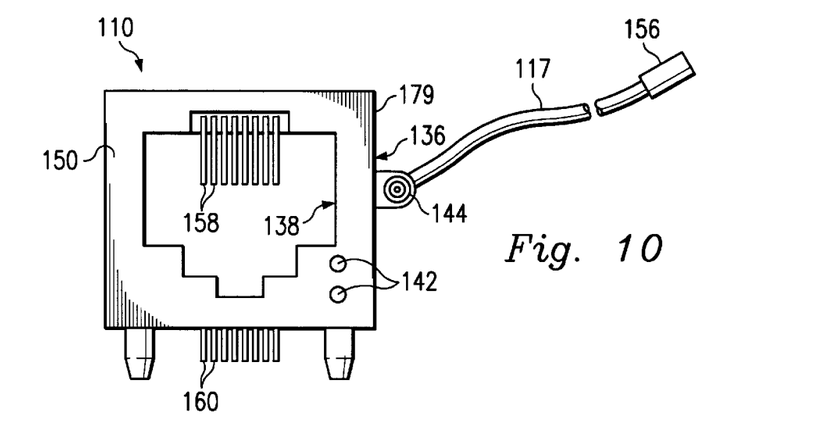
FIG. 10 is a front view of another embodiment of a receptacle assembly.
Figure 11:
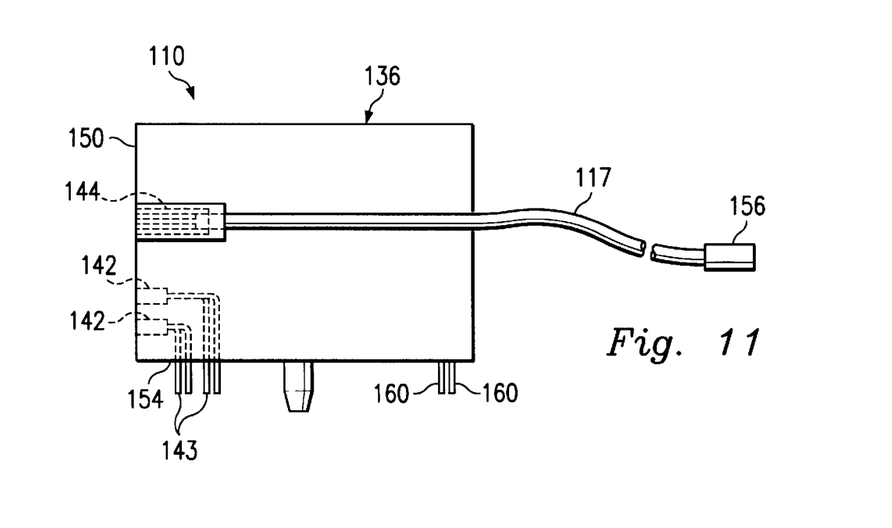
FIG. 11 is a side view of the receptacle assembly illustrated in FIG. 10.

Another embodiment of a control module 119 is illustrated in FIG. 9. The control module 119 includes a connector 176 mounted on an exterior portion, such as directly on the antenna 167, of the control module 119. A corresponding receptacle assembly 110 for use with the control module 119 of FIG. 9 is illustrated in FIG. 10 and 11. In this embodiment of the receptacle assembly 110, the connector 144 is mounted on an exterior portion 179 of the body 136 of the receptacle assembly 110.

Figure 12:
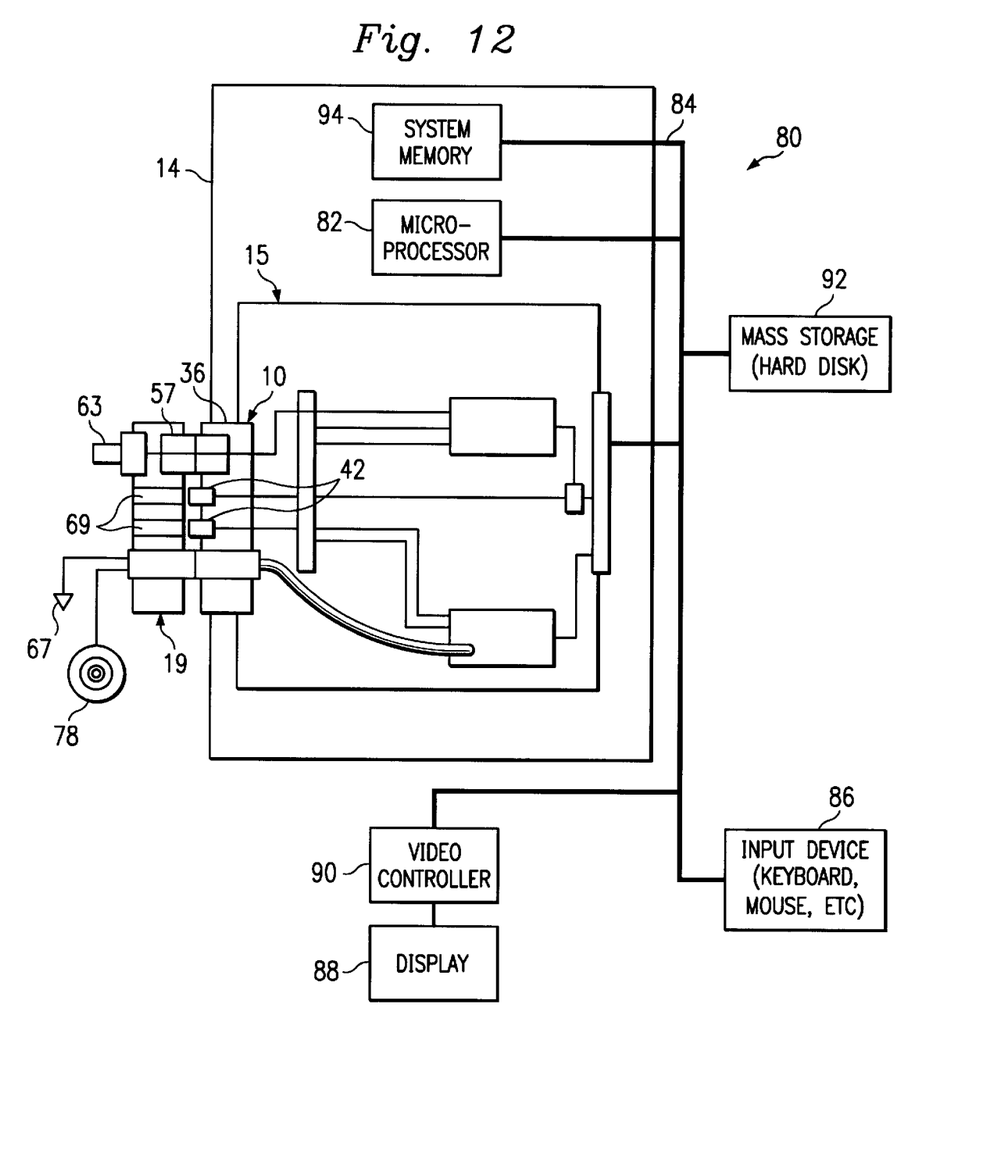
FIG. 12 is a block diagram view illustrating an embodiment of a computer system.

An embodiment of a computer system 80 is illustrated in FIG. 12. The computer system 80 includes at least one microprocessor 82. The microprocessor 82 is connected to a signal bus 84. The signal bus 84 serves as a connection between the microprocessor 82 and other components of the computer system 80. One or more input devices 86 may be coupled to the microprocessor 82 to provide input to the microprocessor 82. Examples of input devices include keyboards, touchscreens, and pointing devices such as a mouse, a trackball and a trackpad. The computer system 80 may also include a display 88 which is coupled to the microprocessor 82 typically by a video controller 90. Programs and data are stored on a mass storage device 92 which is coupled to the microprocessor 82. Mass storage devices include components such as hard disks, optical disks, magneto-optical drives, floppy drives, and the like. A system memory 94 provides the microprocessor 82 with fast storage to facilitate execution of computer programs by the microprocessor 82. It should be understood that other busses and intermediate circuits can be employed between the components described above and microprocessor 82 to facilitate interconnection between the components and the microprocessor 82.

Still referring to FIG. 12, the communication module 15, the microprocessor 82 and the system memory 94 are mounted in the enclosure 14. The body 36 of the receptacle assembly 10 is at least partially mounted in the enclosure 14. The communication module 15 is electrically connected to the bus 84 for communicating with other components of the computer system 80 such as the microprocessor 82. The control module 19 is attached to the jack assembly 10.

As a result, one embodiment provides a control module including a control module having a body and a jack portion extending from the body for being received in a mating receptacle. The jack portion carries a plurality of contacts. A wireless communication portion is attached to the body. A switch portion is attached to the body. The switch portion is electrically connected to at least a portion of the contacts.

Another embodiment provides a communication apparatus including a circuit routing device. A first communication device is electrically connected to the circuit routing device. A second communication device is electrically connected to the circuit routing device. A receptacle assembly is electrically connected to the circuit routing device. A control module is releasably attached to the receptacle assembly. The first communication device is operably connected to the receptacle when the control module is attached to the receptacle assembly. The second communication device is operably connected to the receptacle assembly when the control module is released from the receptacle assembly.

A further embodiment provides a computer system including a microprocessor and a system memory coupled to provide storage to facilitate execution of computer programs by the microprocessor. An input is coupled to provide input to the microprocessor. A display is coupled to the processor by a video controller and a mass storage is coupled to the microprocessor. A wireless communication device and a network interface device are electrically connected to the circuit routing device and to the microprocessor. A receptacle assembly is electrically connected to the circuit routing device. A control module is releasably attached to the receptacle assembly. The wireless communication device is operably connected to the receptacle when the control module is attached to the receptacle assembly. The network interface device is operably connected to the receptacle assembly when the control module is released from the receptacle assembly.

As it can be seen, the communication apparatus disclosed herein provides several advantages. A single receptacle in a receptacle assembly can be used to separately interconnect a plurality of types of communication devices. Additional functionality can be added to the receptacle assembly without requiring any substantial increase in the size of the receptacle assembly. The space required for mounting a conventional receptacle assembly is suitable for the mounting of the receptacle assembly disclosed herein. A simple solution is provided for enabling the operation of one or more of the communication devices that are connected to the receptacle assembly to be manually enabled and/or disabled. An antenna connector, light conducting members and switch can be effectively provided in an existing physical volume required by a conventional receptacle assembly. A single receptacle assembly configuration can be used in a number of different models of electronic devices as well as in electronic devices made by different manufacturers. The receptacle assembly can be cost-effectively manufactured and installed.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A control module, comprising:
   a body having a jack portion formed therewith and extending from the body for being received in a mating receptacle, the jack portion carrying a plurality of contacts;

a wireless communications portion attached to the body; and a switch portion attached to the body, the switch portion being electrically connected to at least a portion of the contacts.

2. The control module of claim 1 wherein the switch portion is manually movable between a first position and a second position, a first one of the contacts being electrically connected to a second one of the contacts when the switch is in the first position, the first one of the contacts being electrically disconnected from the second one of the contacts when the switch is moved to the second position.

3. The control module of claim 1 further comprising:

a control element electrically connected to the switch.

4. The control module of claim 1 further comprising:

an operation indicator portion attached to the body.

5. The control module of claim 1 further comprising:

a control element mounted on the jack portion.

6. The control module of claim 1 wherein the wireless communication portion includes a first antenna connector.

7. The control module of claim 4 wherein the operation indicator portion includes a plurality of light conducting members.

8. The control module of claim 7 wherein the light conducting members extend between a first surface and a second surface of the body and wherein the jack portion is attached to the first surface.

9. The control module of claim 5 wherein the control element is electrically connected between at least two of the plurality of contracts.

10. The control module of claim 6 wherein the first antenna connector is mounted on the jack portion.

11. The control module of claim 6 wherein the wireless communication portion includes a substantially integral antenna operably connected to the first antenna connector.

12. A communication apparatus, comprising:

a circuit routing device;

a first communication device electrically connected to the circuit routing device;

a second communication device electrically connected to the circuit routing device;

a receptacle assembly electrically connected to the circuit routing device; and a control module releasably attached to the receptacle assembly, the first communication device being operably connected to the receptacle when the control module is attached to the receptacle assembly, and the second communication device being operably connected to the receptacle assembly when the control module is released from the receptacle assembly; and the control module having a jack formed therewith for being received in the receptacle assembly.

13. The communication apparatus of claim 12 wherein the first communication device is a wireless communication device.

14. The communication apparatus of claim 12 wherein the circuit routing device includes a selector input electrically connected to the receptacle assembly.

15. The communication apparatus of claim 12 further comprising:

an antenna connector attached to the receptacle assembly and a controlled impedance interface connected between the antenna connector and the first communication device.

16. The communication apparatus of claim 12 wherein the control module includes a wireless communication portion, the wireless communication portion being operably connected to the first communication device when the control module is attached to the receptacle assembly.

17. The communication apparatus of claim 12 wherein the first communication device is a wireless communication device and the second communication device is a network interface device.

18. The communication apparatus of claim 12 wherein the circuit routing device includes a multiplexor having a selector input, the selector input being electrically connected to a contact mounted on the receptacle assembly.

19. The communication assembly of claim 14 wherein the control module includes a control element, the control element being electrically connected to the selector input for operably connecting the first communication device to the receptacle assembly when the control module is attached to the receptacle assembly.

20. The communication apparatus of claim 15 wherein the control module includes a wireless communication portion, the wireless communication portion being operably connected to the antenna connector when the control module is attached to the receptacle assembly.

21. A computer system, comprising:

a microprocessor;

a system memory coupled to provide storage to facilitate execution of computer programs by the microprocessor;

an input coupled to provide input to the microprocessor;

a display coupled to the processor by a video controller;

a mass storage coupled to the microprocessor;

a circuit routing device;

a wireless communication device electrically connected to the circuit routing device and to the microprocessor;

a network interface device electrically connected to the circuit routing device and to the microprocessor;

a receptable assembly electrically connected to the circuit routing device; and a control module releasably attached to the receptable assembly, the wireless communication device being operably connected to the receptacle assembly when the control module is attached to the receptacle assembly, and the network interface device being operably connected to the receptacle assembly when the control module is released from the receptacle assembly; and the control module having a jack formed therewith for being received in the receptacle assembly.

* * * * *